W. F. HOFMANN.
Hose-Coupling.
No. 216,851. Patented June 24, 1879.
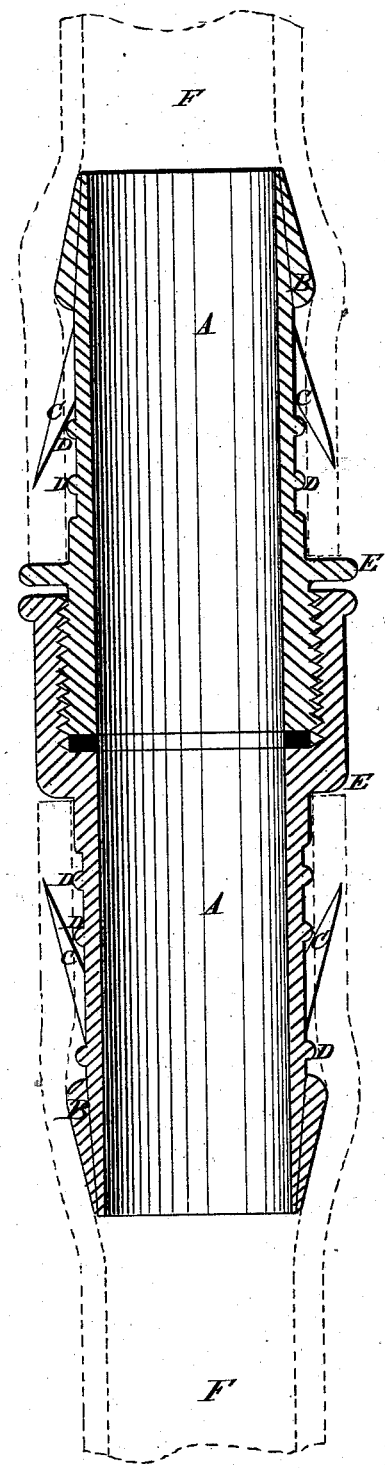
WITNESSES:
Achilles Schehl
C. Sedgwick
INVENTOR:
W. F. Hofmann
BY Munn & Co
ATTORNEYS.

UNITED STATES PATENT OFFICE.

WILLIAM F. HOFMANN, OF PHILADELPHIA, PENNSYLVANIA, ASSIGNOR TO HIMSELF AND CHARLES M. GHRISKEY, OF SAME PLACE.

IMPROVEMENT IN HOSE-COUPLINGS.

Specification forming part of Letters Patent No. 216,851, dated June 24, 1879; application filed May 21, 1879.

*To all whom it may concern:*

Be it known that I, WILLIAM F. HOFMANN, of Philadelphia, in the county of Philadelphia and State of Pennsylvania, have invented a new and Improved Hose-Coupling, of which the following is a specification.

The drawing represents a vertical sectional view of the coupling uniting two sections of hose.

The object of the invention is to provide a simple and effective coupling, to which hose can be securely and quickly attached without the use of bands or wires or any other of the common devices.

The invention consists of the tube A, provided with a conical ring, B, and one or more short, sharp, backward-sloping spurs, C C, and further provided with the rings D D and collar or shoulder E, common to hose-couplings. The hose F is secured to this coupling by pressing it over the conical ring and the spurs to the collar, as shown, when the contraction of the hose causes the spurs to become embedded in it and the conical ring, in connection with the other rings and collar, to form a water-tight joint.

The spurs may be cast with the coupling as a part of it, or may be soldered or fastened in some other convenient manner, and they may be placed or located as shown, or be attached to the conical ring, and the ring itself may be made separate from the tube A, and afterward soldered or screwed on, or it may be cast with and as a part of it.

It is obvious that by this device hose may be attached to a coupling with the greatest ease and quickness, and held as securely as it would be by any of the devices now in use.

Having thus described my invention, I claim as new and desire to secure by Letters Patent—

1. The within-described hose-coupling, consisting of tube A, provided with conical ring B, spurs C C, rings D D, and collar or shoulder E, substantially as and for the purpose described.

2. A hose-coupling with backward-sloping spurs C C to hold the hose upon it, substantially as herein shown and described.

3. In a hose-coupling, the combination of the conical ring B and spurs C C, substantially as and for the purpose described.

WILLIAM F. HOFMANN.

Witnesses:
    JOHN A. MATLOCK,
    HENRY C. GHRISKEY.